United States Patent
Agevik et al.

(10) Patent No.: US 8,655,313 B2
(45) Date of Patent: Feb. 18, 2014

(54) METHOD AND APPARATUS FOR VERIFICATION OF A TELEPHONE NUMBER

(75) Inventors: Niklas Agevik, Stockholm (SE); Bjorn Idren, Hasselby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/255,399

(22) PCT Filed: Jul. 14, 2009

(86) PCT No.: PCT/SE2009/050897
§ 371 (c)(1),
(2), (4) Date: Sep. 8, 2011

(87) PCT Pub. No.: WO2011/008140
PCT Pub. Date: Jan. 20, 2011

(65) Prior Publication Data
US 2012/0003957 A1    Jan. 5, 2012

(51) Int. Cl.
*H04M 1/66* (2006.01)
(52) U.S. Cl.
USPC ......... 455/410; 455/411; 455/432.3; 455/433
(58) Field of Classification Search
None
See application file for complete search history.

(56) References Cited

U.S. PATENT DOCUMENTS

| 7,437,145 B2 * | 10/2008 | Hamada | 455/410 |
| 2003/0027581 A1 * | 2/2003 | Jokinen et al. | 455/456 |
| 2004/0049677 A1 * | 3/2004 | Lee et al. | 713/166 |
| 2004/0162998 A1 | 8/2004 | Tuomi et al. | |
| 2006/0160532 A1 * | 7/2006 | Buckley et al. | 455/422.1 |
| 2006/0189297 A1 * | 8/2006 | Jung | 455/406 |
| 2007/0142044 A1 * | 6/2007 | Fitzgerald et al. | 455/422.1 |
| 2010/0029247 A1 * | 2/2010 | De Atley et al. | 455/411 |

FOREIGN PATENT DOCUMENTS

| WO | 03/032667 A2 | 4/2003 |
| WO | 2007/023343 A1 | 3/2007 |

OTHER PUBLICATIONS

3GPP; "Universal Mobile Telecommunications System (UMTS); Generic Authentication Architechture (GAA); Generic Bootstrapping Architecture" ; ETSI TS 33.220, Ver. 6.3.0, Release 6; Dec. 2004; 40 pages; XP14028221A.

* cited by examiner

*Primary Examiner* — Suhail Khan
(74) *Attorney, Agent, or Firm* — Rothwell, Figg, Ernst & Manbeck, P.C.

(57) ABSTRACT

The invention relates to a method and apparatus for verification of a mobile telephone number. The method comprises: storing a mobile telephone number and a corresponding mobile subscriber identity number; receiving a request for verification of the mobile telephone number; sending, in response to the request, an IMSI query requesting a mobile subscriber identity number registered in association with the mobile telephone number in an HLR; receiving, in response to the IMSI query, the mobile subscriber identity number associated with the mobile telephone number in the HLR; comparing the stored mobile subscriber identity number and the received mobile subscriber identity number, and, if the comparison shows that the received mobile subscriber identity number corresponds to the stored mobile subscriber identity number; initiating the performance of the messaging-or-positioning service in relation to the mobile telephone number.

18 Claims, 12 Drawing Sheets

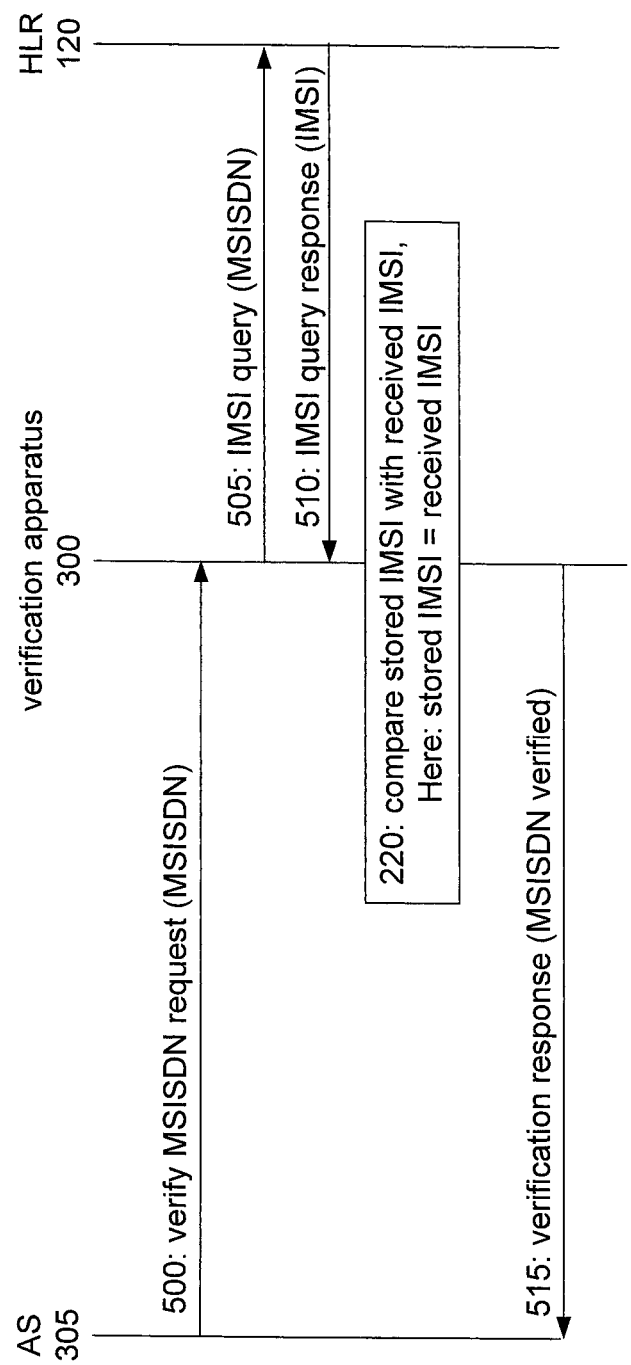

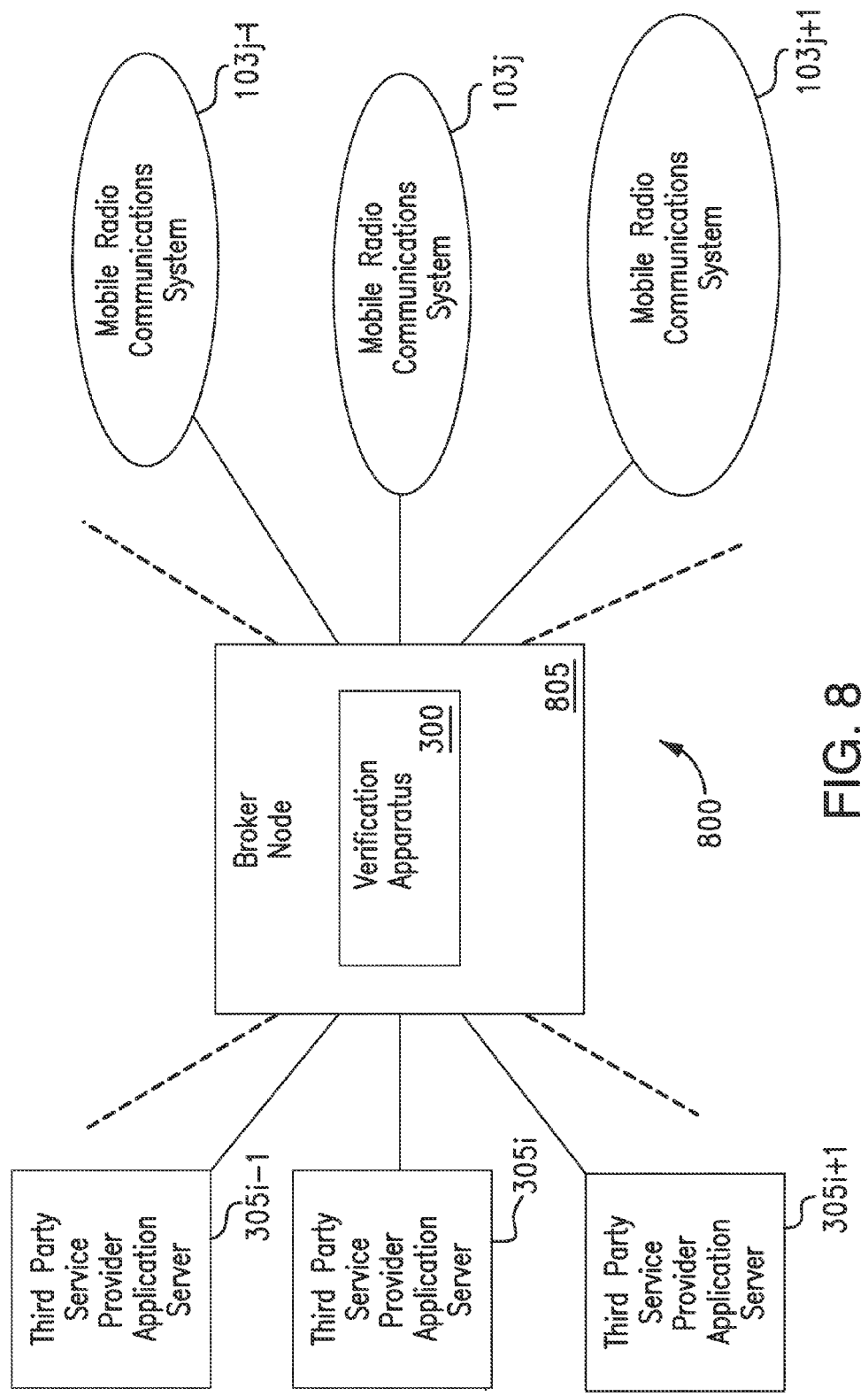

METHOD AND APPARATUS FOR VERIFICATION OF A TELEPHONE NUMBER

CROSS REFERENCE TO RELATED APPLICATION(S)

This application is a 35 U.S.C. §371 National Phase Entry Application from PCT/SE2009/050897, filed Jul. 14, 2009, designating the United States, the disclosure of which are incorporated herein in its entirety by reference.

TECHNICAL FIELD

The invention relates to the field of mobile radio communication, and in particular to improvements of security of services utilizing such communication.

BACKGROUND

The great market penetration of mobile communication devices in most parts of the world has attracted many industries to provide services by means of mobile radio communications systems. One example is the banking industry, where some banks offer their customers the possibility of receiving information via the Short Message Service (SMS). In the banking industry, as well as in other industries handling information which may be sensitive, privacy and secrecy of information is often of high concern. Although highly convenient, the transmission of information via SMS is generally not entirely secure. Many supporters of SMS based services claim that while SMS banking is not as secure as other conventional banking channels, SMS banking is not intended to be used for very high-risk transactions. However, there is still a desire to improve the security of the delivery of SMS banking and other services utilizing mobile radio communications systems.

SUMMARY

A problem to which the invention relates is how to improve the security of third party services utilizing messaging-or-positioning services provided through a mobile radio communications network.

The invention relates to a method for verification of a mobile telephone number in order to determine whether a messaging-or-positioning service in a mobile radio communications system should be performed in relation to the mobile telephone number. The method comprises: storing a mobile telephone number and a corresponding mobile subscriber identity number in a database of a verification apparatus; receiving, in the verification apparatus, a request for verification of the mobile telephone number; sending, from the verification apparatus in response to the verification request, an IMSI query requesting a mobile subscriber identity number registered in association with the mobile telephone number in a home location register; receiving, in the verification apparatus, the mobile subscriber identity number associated with the mobile telephone number in the home location register; comparing, in the verification apparatus, the stored mobile subscriber identity number and the received mobile subscriber identity number; and, if the comparison shows that the received mobile subscriber identity number corresponds to the stored mobile subscriber identity number: initiating the performance of the messaging-or-positioning service in relation to the mobile telephone number.

Hereby is achieved that it can be detected if the mobile subscription to which a mobile telephone number is associated has changed between the time of storing the mobile telephone number and the time of initiating a messaging-or-positioning service in relation to the mobile telephone number. The performance of a messaging-or-positioning service could be made conditional on the result of the verification of the mobile telephone number.

The home location register mentioned in this application should not only be interpreted as being a home location register as specified within GSM (Global System for Mobile Communications), but a server comprising the functionality corresponding to the home location register as specified in the detailed description independently of how it is termed in a particular telecommunications network. One example of an alternative term is HSS (Home Subscriber Server) as specified in IMS (Internet Protocol Multimedia Subsystem).

The storing may comprise: receiving, in the verification apparatus, a request for registering of a mobile telephone number; sending, from the verification apparatus in response to the request for registering a mobile telephone number, a first IMSI query requesting a mobile subscriber identity number registered in association with the mobile telephone number in a home location register; receiving, in the verification apparatus in response to the first IMSI query, the mobile subscriber identity number associated with the mobile telephone number in the home location register; and wherein the storing comprises storing, as the corresponding mobile subscriber identity number, the mobile subscriber identity number received in response to the first IMSI query. By this aspect is achieved that registering of a mobile telephone number in a verification apparatus can conveniently be performed.

The method may comprise sending a verification response indicative of the result of the comparison. In one embodiment, the verification response comprises an indication of whether or not the stored mobile subscriber identity number and the received mobile subscriber identity number have been issued by the same mobile network operator. Such indication could for example be given only in scenarios where the comparison shows that the received mobile subscriber identity number does not correspond to the stored mobile subscriber identity number.

The verification apparatus could for example be included in an application server arranged to provide a third party service which utilizes the messaging-or-positioning service. In this implementation, the request for verification is advantageously generated by the application server; and the initiating advantageously comprises the application server sending a request for performance of the messaging-or-positioning service.

In another embodiment the verification apparatus could for example be included in an application server operating as a broker node of services in a communications system. In this implementation, the verification request could be received from an application server arranged to provide a third party service which utilizes the messaging-or-positioning service; the initiating comprises the broker node performing the service, or sending a request for performance of the messaging-or-positioning service to a mobile radio communications network in the communications system, or sending a verification response indicative of the result of the comparison to the application server.

In an embodiment wherein the messaging-or-positioning service forms part of a third party service, the method could further comprise sending a message to the mobile telephone number via the mobile radio communications system if the comparison shows that the received mobile subscriber identity number does not correspond to the stored mobile subscriber identity number, the message indicating that delivery of the third party services has been terminated in relation to the telephone number. Such a message could for example be sent from the verification apparatus, or from application server providing the third party service. By sending such a message, it can be ensured that a mobile subscriber, who has kept his mobile telephone number but for whom the subscription has been altered, will be notified when a third party service is terminated due to the changes made to his subscription. The mobile subscriber could then take suitable action to re-activate the third party service, if desired.

An embodiment provides a method for requesting a messaging-or-positioning service in a mobile radio communications system. This method comprises sending, from an application server to a verification apparatus, a request for registering a mobile telephone number in the verification apparatus, wherein the request comprises an indication of the mobile telephone number. This method further comprises sending, from the application server to the verification apparatus, a request for verification of the mobile telephone number in order to determine whether a messaging-or-positioning service in a mobile radio communications system should be performed in relation to the mobile telephone number.

The invention also relates to a verification apparatus for verification of a mobile telephone number in order to determine whether a messaging-or-positioning service in a mobile radio communications system should be performed in relation to the mobile telephone number is also provided. In one embodiment, the verification apparatus comprises: a database for storing of a mobile telephone number and an associated mobile subscriber identity number; a first input arranged to receive a request for verification of a mobile telephone number; an output arranged to send an IMSI query in relation to a mobile telephone number, the IMSI query requesting a mobile subscriber identity number registered in association with the mobile telephone number in a home location register; a second input arranged to receive a mobile subscriber identity number in response to an IMSI query in relation to a mobile telephone number; and processing means arranged to compare a mobile subscriber identity number stored in the database in relation to a mobile telephone number with a mobile subscriber identity number received in response to an IMSI query in relation to the mobile telephone number, and to initiate the performance of the messaging-or-positioning service in relation to the mobile telephone number if the comparison shows that the received mobile subscriber identity number corresponds to the stored mobile subscriber identity number.

Furthermore the invention also relates to an application server arranged to provide a third party service which utilizes a messaging-or-positioning service is also provided. The application server comprises: an output arranged to send, to a verification apparatus, a request for registering a mobile telephone number in the verification apparatus, the request for registering comprising an indication of the mobile telephone number. The output is further arranged to send, to the verification apparatus, a request for verification of the mobile telephone number in order to determine whether a messaging-or-positioning service in a mobile radio communications system should be performed in relation to the mobile telephone number. In one embodiment, the application server comprises the verification apparatus.

The application server may comprise an input arranged to receive a verification response indicative of the result of the verification of a mobile telephone number; a third party service customer information register; and processing means arranged to store, in the third party service customer information register as part of third party service subscription information relating to a telephone number, if a verification response received by the output indicates that the verification result in relation to the mobile telephone number was negative, information indicating that a verification result is negative.

Moreover, the invention also relates to a computer program for verification of a mobile telephone number in order to determine whether a messaging-or-positioning service in a mobile radio communications system should be performed in relation to the mobile telephone number is also provided. The computer program comprises computer program code portions which, when run on a verification apparatus, causes the verification apparatus to: store a mobile telephone number and a corresponding mobile subscriber identity number in a database of the verification apparatus; send, in response to a verification request, an IMSI query requesting a mobile subscriber identity number registered in association with the mobile telephone number in a home location register; retrieve, from the database, the stored mobile subscriber identity number; compare the stored mobile subscriber identity number and a mobile subscriber identity number received in response to the IMSI query; and initiate the performance of the messaging-or-positioning service in relation to the mobile telephone number if the comparison shows that the received mobile subscriber identity number corresponds to the stored mobile subscriber identity number.

The invention also relates to a computer program product comprising computer readable means on which the computer program is stored.

Further aspects of the invention are set out in the following detailed description and in the accompanying claims.

BRIEF DESCRIPTION OF THE DRAWINGS

FIG. 5a is a signaling diagram illustrating a signalling scenario in an embodiment of a method for verifying a mobile telephone number.

FIG. 6b is a schematic illustration showing another aspect of the embodiment of the verification apparatus illustrated in FIG. 6a.

FIG. 8 is a schematic illustration of a communications system comprising a broker node including a verification apparatus.

DETAILED DESCRIPTION

Figure 1:
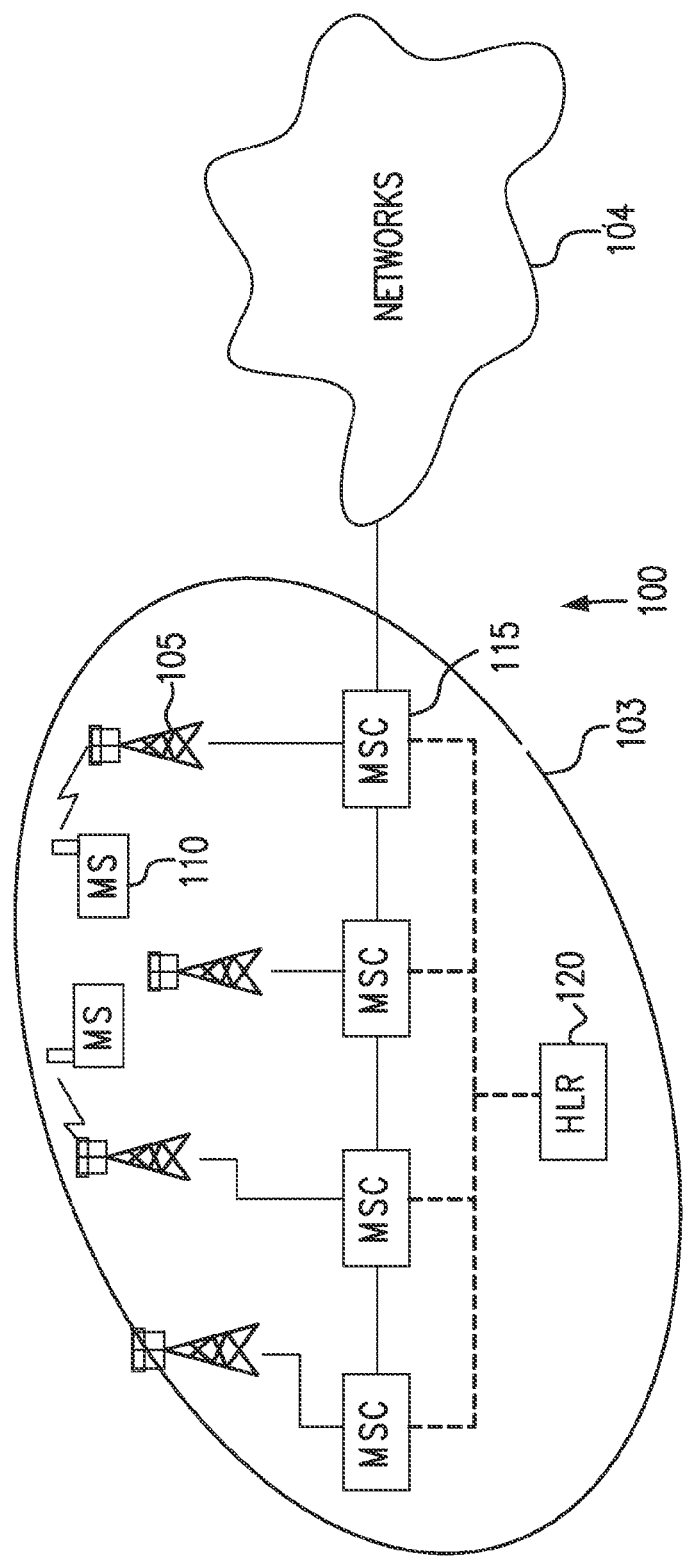
FIG. 1 is a schematic illustration of a mobile radio communications system comprising a mobile radio communications network.

An example of a mobile radio communications system 100 is schematically illustrated in FIG. 1. Mobile radio communications system 100 comprises at least one mobile radio communications network 103, which hereinafter in the description will be called network 103 for short. A mobile radio communications network 103 is typically connected to other networks 104, such as for example Public Switched Telephone Networks (PSTNs), other mobile radio networks, the Internet, etc.

Network 103 comprises a plurality of radio base stations 105 providing mobile radio communication to mobile stations (MSs) 110 over an air interface. An MS 110 could for example be a mobile telephone, a radio equipped laptop computer, a handheld computer, or any other radio capable device. A radio base station 105 is connected, often via a base station controlling node, to a Mobile Switching Centre (MSC) 115, which inter alia may provide routing and mobility management of communication sessions to and from MS:s 110. Typically, a plurality of radio base stations 105 are connected to each MSC 115.

Network 103 of FIG. 1 furthermore comprises a Home Location Register (HLR) 120, which comprises a central database containing details of the subscriptions to mobile services in the network 103. In particular, the HLR 120 stores, for each subscription, a mobile subscriber identity number, often referred to as the International Mobile Subscriber Identity (IMSI), and at least one telephone number assigned to the subscription, such telephone number often referred to as an MSISDN of the subscription. The mobile subscriber identity number and mobile telephone number are typically also stored on a Subscriber Identity Module (SIM) card (not shown) used in conjunction with an MS 110 to identify the mobile subscription on the MS 110. The terms IMSI and MSISDN are here, whenever mentioned in the description and figures, used to refer to mobile subscriber identity numbers and mobile telephone numbers in general, including when referring to mobile subscriber identity numbers and mobile telephone numbers in standards for mobile radio communications wherein a different terminology is used.

Via for example the Internet or other networks 104, a service provider which is external to the network 103 could utilize a messaging service and/or a positioning service as part of a service provided to a customer who is also a subscriber to services in a mobile radio communications network. In the following, the term messaging-or-positioning service will be used when referring to a service which is performed with the help of a mobile radio communications network in relation to a mobile telephone number, where the service is either a messaging service or a positioning service. A messaging-or-positioning service could for example be a Short Message Service (SMS), Multimedia Messaging Service (MMS), an e-mail service, a data stream service, a push notification service, a Wireless Application Protocol (WAP) service, a positioning service based on triangulation, a positioning service based on identification of the cell wherein the mobile subscription, to which the mobile telephone number is associated, is currently active, etc.

A service provider external to the network 103 will hereinafter be referred to as a third party service provider, and a service provided by a third party service provider will be referred to as a third party service. A third party service could for example be an off-portal service, i.e. a service which is not provided via a portal run by the operator of the network 103 in which the receiver of the third-party service is registered, but is provided from the third-party service provider directly. A third party service provider could for example be a mobile network operator providing services to mobile subscribers in networks 103 operated by other operators, or a service provider which does not operate any mobile radio communications network, but a service provider that utilizes the network 103 to communicate with the MS 110.

Third-party services wherein a messaging-or-positioning service is utilized could for example be: a service provided by a bank, wherein an account statement or other information is sent to an account holder via SMS or other messaging service; a security enhancement service provided by a company running a webpage where its customers hold accounts, wherein a pin-code of an account may be sent via SMS or other messaging service to a mobile subscription of the account holder; a cash-machine service wherein cash machine fraud is prevented by checking that the location of a bank account holder coincides with that of the cash machine by comparing the position of the bank account holder's mobile subscription with a stored position of the cash-machine (ATM) before allowing the withdrawal of money, etc. There are numerous other ways in which messaging-or-positioning services could be utilized by third party services.

In many third party services which utilize messaging-or-positioning services, the privacy of the service users, and/or the secrecy of information which is provided to or by the service, is of importance. For example, a company running a webpage might not want to send a pin-code via SMS to an account holder if there is a considerable risk that the SMS will end up in the wrong hands; a cash-machine operator may not want to perform a positioning of a mobile subscription, in the cash machine example given above, if there is a considerable risk that the mobile subscription does not belong to the bank account holder but could belong to a person who has not approved of being positioned, etc.

In order to enjoy a third party service utilizing a messaging-or-positioning service, a customer of the third party service will often have to provide the third party service provider with the mobile telephone number of his or her mobile subscription. Since a mobile telephone number is a number which is unique to a subscription, the mobile telephone number can be used as an identifier of a mobile subscription of a customer of a third party service provider. However, when a mobile subscription is terminated, the mobile telephone number is often transferred to a new subscription. Unless the customer to the third party service informs the third party service provider that he/she is no longer in possession of the mobile telephone number, a messaging-or-positioning service forming part of the third party service, such as the sending of an SMS or positioning of the mobile subscription, will be performed in relation to the wrong person. It is true that some mobile network operators have policies defining a time span within which a mobile telephone number of a terminated subscription cannot be re-used for a new subscription. However, if the third party service provider is never informed of the termination of the mobile subscription, such time span will only temporarily prevent that the messaging-or-positioning service utilizing part of the third party service is performed in relation to the wrong person.

As mentioned above, a mobile radio communications network typically uses a mobile subscriber identity number for identification of a mobile subscription. The network 103 stores the mobile subscriber identity number and the mobile telephone number in the HLR 120. According to an aspect of the invention, a verification apparatus is provided, whereby the mobile subscriber identity number associated with a mobile telephone number may be verified in order to avoid that a third party service is delivered in relation to the wrong person. By storing the mobile telephone number and corresponding mobile subscriber identity number of a customer to a third party service, and by checking that the mobile subscriber identity number which is associated with the mobile telephone number has not been changed before delivery of the third party service to the customer, any transfer of the mobile telephone number to a new subscription that has occurred since the mobile telephone number was stored will be detected, since when transferring a mobile telephone number to a new subscription, the mobile subscriber identity number associated with the mobile telephone number will be changed.

Figure 2:
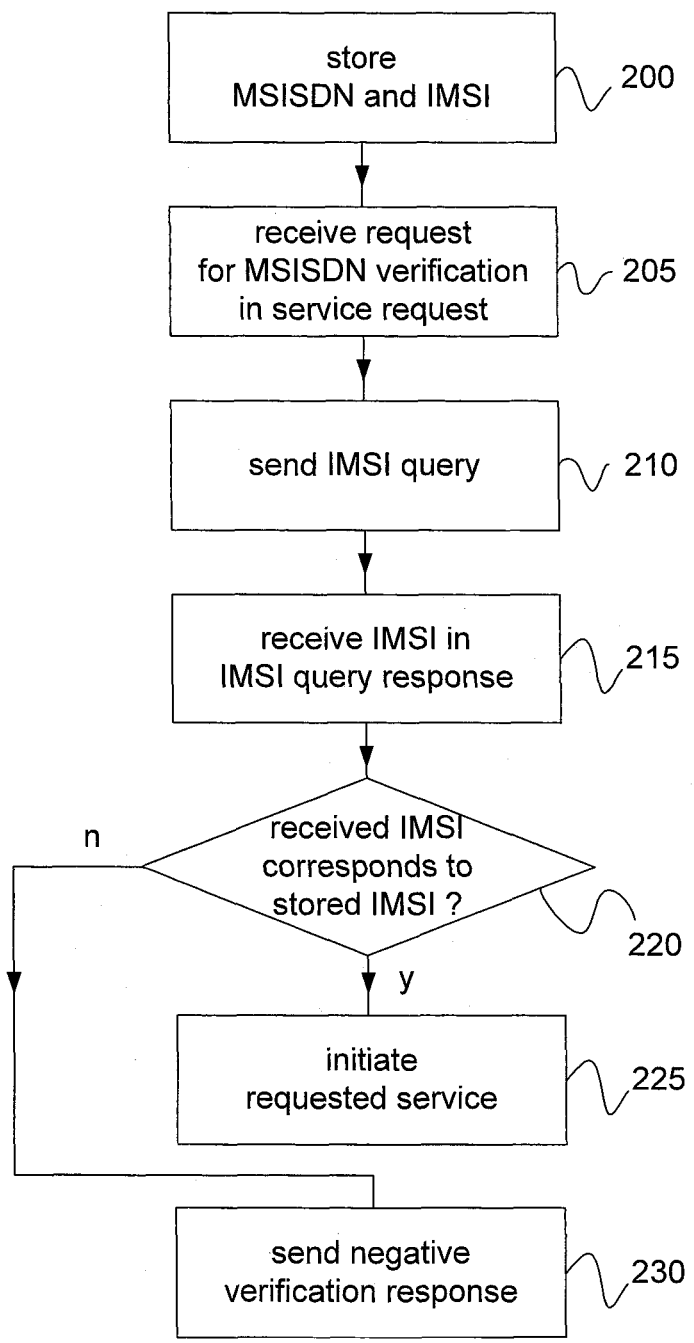
FIG. 2 is a flowchart illustrating an embodiment of a method for verification of a mobile telephone number.

An embodiment of a method performed by a verification apparatus is schematically illustrated in FIG. 2. By means of the method of FIG. 2, it may be determined whether a messaging-or-positioning service should be performed in relation to a particular mobile telephone number. In step 200, a mobile telephone number, as well as the mobile subscriber identity number associated with the mobile telephone number in the network 103 wherein the mobile subscription is held, is stored in a database of the verification apparatus. In step 205, a request for verification of the mobile telephone number is received, for example from an application server of a third party service provider. The verification request is sent by the third party application server in relation to a messaging-or-positioning service to be performed in relation to the mobile telephone number, and the result of the verification will be used in determining whether or not the messaging-or-positioning service should be performed.

In step 210, an IMSI query is transmitted towards the HLR 210 in which the subscription associated with the mobile telephone number is registered. The IMSI query sent in step 210 comprises information on the mobile telephone number, and is a request for information on the mobile subscriber identity number associated with the mobile telephone number in the HLR 210 in which the mobile telephone number is registered. As will be further discussed in relation to FIG. 3 below, the IMSI query may for example be sent via a gateway of the network 103. If the IMSI query sent by the verification apparatus is on a format which is incompatible with the transmission protocol used by the HLR 210, the IMSI query sent by the verification apparatus could for example trigger such gateway, or another node, to send a corresponding IMSI query on a format compatible with the transmission protocol used by the HLR 120.

In step 215, an IMSI query response is received from the HLR, where the IMSI query response comprises the mobile subscriber identity number or information indicative of the mobile subscriber identity number associated with the mobile telephone number in the HLR. In step 220, the mobile subscriber identity number which is received in the IMSI query response is compared to the mobile subscriber identity number which was stored in association with the mobile telephone number in step 200. If the received mobile subscriber identity number corresponds to the stored mobile subscriber identity number, then it may be concluded that the mobile telephone number is still in use by the same subscriber as at the time of performing step 200 (the received mobile subscriber identity number and the stored mobile subscriber identity numbers may be expressed in different formats, and an exact identity is therefore not necessarily required for correspondence between the two).

If the received mobile subscriber identity number corresponds to the stored mobile subscriber identity number, then step 225 is entered, wherein the messaging-or-positioning service is initiated in relation to the mobile telephone number. If, on the other hand, the verification result obtained in step 220 is negative, i.e. if the received mobile subscriber identity number does not correspond to the stored mobile subscriber identity number, the messaging-or-positioning service is not initiated. Instead, step 230 is entered, wherein a verification response is sent to the node from which the verification request was received in step 205, the verification response comprising an indication of the negative verification result.

The initiation of the requested service of step 225 could be performed in different ways. The initiating could for example include sending a verification response to the requester of the verification, where the verification response comprises an indication indicating that the result of the verification was positive, i.e. that the received mobile subscriber number was found to correspond to the stored mobile subscriber number. Upon receipt of the positive verification response, the requester of the verification could then send a request for performance of the messaging-or-positioning service to a network 103. If the verification request received in step 205 is included in a request for the messaging-or-positioning service, the initiating of the requested service could include sending, to a mobile radio communications network, a request for performance of the messaging-or-positioning service in relation to the telephone number. If the verification apparatus can perform at least parts of the service, the initiating could include performing those parts of the service.

A request for performance of the messaging-or-positioning service sent to a network 103 could be sent in accordance with a proprietary protocol, or a standardized protocol could be used for the transmission of the request for performance. For example, if the messaging-or-positioning service is the SMS, the Short Message Peer-to-peer Protocol (SMPP) could be used for the request for performance of the messaging-or-positioning service. Other protocols may alternatively be used. The network 103, to which a request for performance is sent, could be any network 103: The network 103 in which the mobile telephone number is registered, or a different network 103.

As mentioned above, a verification response, comprising information based on the result of the comparison performed in step 220, could be transmitted to the sender of the request for verification of the mobile telephone number also when the verification result is positive. The sending of a verification response could be omitted, if desired, for example if an acknowledgement in relation to whether or not the requested messaging-or-positioning service has been successfully performed will be sent to the requester of the verification.

A result of the verification could be registered in the verification apparatus in association with the stored mobile telephone number and associated mobile subscriber identity number, if desired. For example, a result of the comparison could be stored; the time of the verification could be stored, etc.

A verification response, to be transmitted by the verification apparatus to the requester of the verification, could include information on whether the mobile subscriber identity number, stored by the verification apparatus in relation to the mobile telephone number, corresponds to the mobile subscriber identity number received from the HLR, in which the mobile telephone number is registered. Such information could for example be indicated by means of a flag in the verification response message, or in any other way. Depending on which information is received by the verification apparatus in the IMSI query response, the verification response message could include further information. For example, if the IMSI query response includes information on in which network 103 the mobile telephone number is currently registered, the verification response could include information indicative of whether the mobile telephone number is registered in the same network 103 as when the mobile telephone number was stored in step 200 by the verification apparatus, or in a different network. Such information could be included as a flag in the verification response message, or as an indicator which could take more than two values. For example, a 2-bit indicator could be used, which could for example take one of the following values: 1) the mobile subscriber identity number has not changed; 2) the mobile subscriber identity number has changed within the same network; 3) the mobile subscriber identity number has changed and the mobile network has changed; 4) the mobile telephone number is not in use. Alternatively, the verification response message could include an identity of the network 103 with which the mobile telephone number is currently stored. From information relating to whether the network 103 with which the mobile telephone number is registered has changed, conclusions may be drawn regarding whether it is likely that the mobile telephone number is now in use by a different subscriber in the same network 103, or whether the possessor of the mobile telephone number has moved his/her subscription to a new network. Other information could also be provided in a verification response message, such as for example information on in which network the mobile subscription is currently active.

When the messaging-or-positioning service forms part of a third party service, a message could be sent to the mobile telephone number in response to a negative verification result, if desired, the message informing the subscriber in possession of the mobile telephone number that the third party service will be terminated in relation to the mobile telephone number. This can be useful, since there are situations where the mobile subscriber identity number is changed although the mobile telephone number is still in use by the same person. For example, if a user of a mobile telephone number decides to move his mobile subscription to a different network 103, or if he has requested a new SIM-card in order to access different services provided by his network 103, the mobile subscriber identity numbers is typically changed. Such message could for example be sent to the mobile telephone number by the third party application server, or by the verification apparatus.

The method illustrated in FIG. 2 could be implemented in relation to a mobile subscription in a network 103 operating according to any standard, such as for example the Global System for Mobile communications (GSM) standard, the Universal Mobile Telecommunications System (UMTS) standard, the Long Term Evolution (LTE) standard, etc. The flowchart of FIG. 2 relates to a single mobile telephone number. However, a verification apparatus operating according to the method illustrated by FIG. 2 could be used for the verification of a plurality of mobile telephone numbers, registered in the same or different networks 103, where different networks 103 could be of the same or different standards. Step 200 would typically be performed once per mobile subscription, whereas steps 205-220 would typically be performed in relation to a mobile telephone number any time a third party service provider requests verification of the mobile telephone number. Hence, a considerable period of time may lapse between the performance of step 200 and steps 205-230 in relation to the same mobile telephone number.

A message type which already exists in a mobile telephony standard could for example be used for the IMSI query sent in step 210. Examples of already existing message types which could be used are the Mobile Application Part Send Routing Information (MAP SRI) message type which is specified in ETSI Technical Specification (TS) 129 002 v.8.9.0 or ETSI TS 100 974 v.7.15.0 (for example SRI for SMS, or other SRI messages, such as an SRI message for use by an MSC 115 to request routing information from an HLR 120), the send IMSI message type, or any another suitable message type providing an HLR look-up possibility. In an MAP SRI request, the mobile telephone number is included, and in an MAP SRI response, the associated mobile subscriber identity number is included. MAP signalling is typically performed via the SS7 signalling network which is used for signalling between different nodes in mobile radio communications networks 103 and in other telephony networks. Alternatively, a new message type could be specified to be used as the IMSI query.

Figure 3:
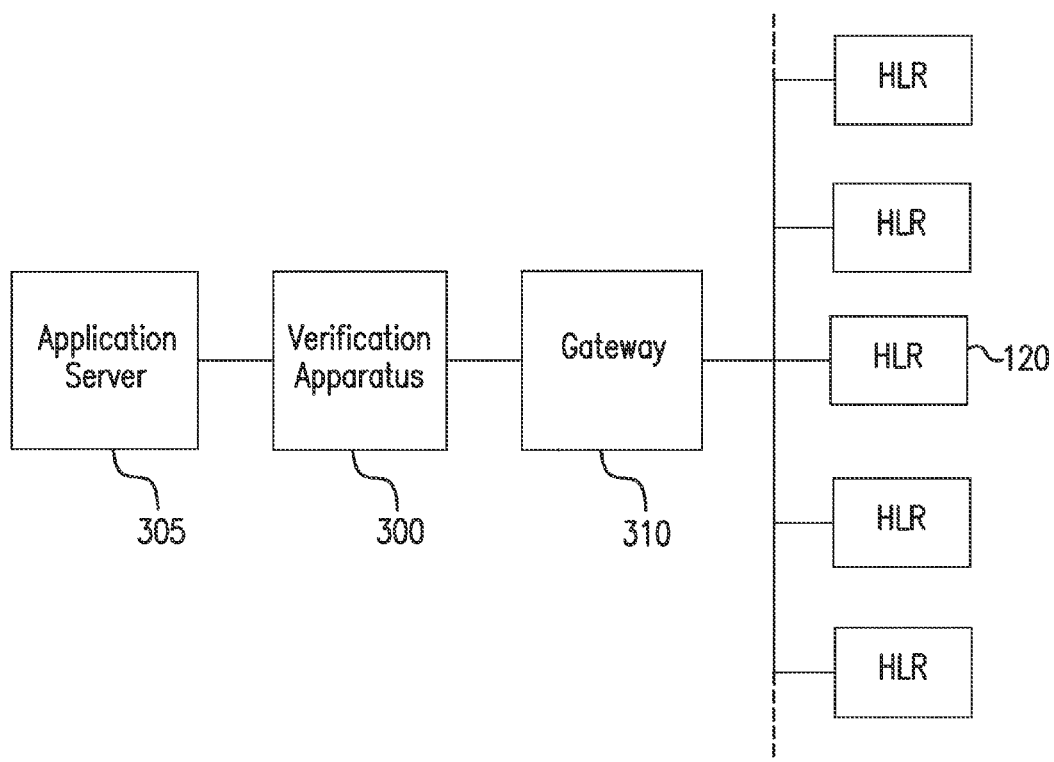
FIG. 3 illustrates an embodiment wherein a verification apparatus can communicate with HLRs via a gateway.

Oftentimes, a verification apparatus for performing the method of FIG. 2 does not have direct access to the SS7 signalling network, or other means for communicating directly with the HLR 120 of the network 103 wherein a mobile telephone number is registered. In such cases, the verification apparatus could for example be connected to an application server or gateway 310, which could for example be an application server or a gateway 310 of a PLMN or of a mobile radio communications network 103, for example a gateway MSC. This is illustrated in FIG. 3, wherein a verification apparatus 300 is connected to gateway 310 and to an Application Server (AS) 305 of a third party service provider, hereinafter referred to as third party application server 305 or AS 305 for short. The gateway 310 is capable of communicating with at least one, and typically a plurality of HLRs 120, wherein an HLR 120 stores values of mobile subscriber identity numbers associated with mobile telephone numbers currently registered in a network 103. In this set-up, the IMSI query of step 210 of FIG. 2 could for example be a proprietary message instructing the gateway 310 to send a suitable IMSI query message to the relevant HLR 120 for the mobile subscriber identity number associated with the mobile telephone number included in the IMSI query. The gateway 310, or another node instructed to do so by the gateway 310, could then send a suitable IMSI query message compatible with the relevant HLR 120, for example a MAP SRI message or other message sent as discussed above, to the relevant HLR 120. Alternatively, the IMSI query sent by the verification apparatus 300 could be on the format compatible with the relevant HLR 120. In a network scenario where the verification apparatus is utilizing an HLR 120 in the form of an HSS in an IMS core network, the verification apparatus could contact the HSS via the gateway 310 in the form of an I-CSCF (Interrogating Call Session Control Function), which communicate with the HSS using the protocol DIAMETER.

Figure 4:
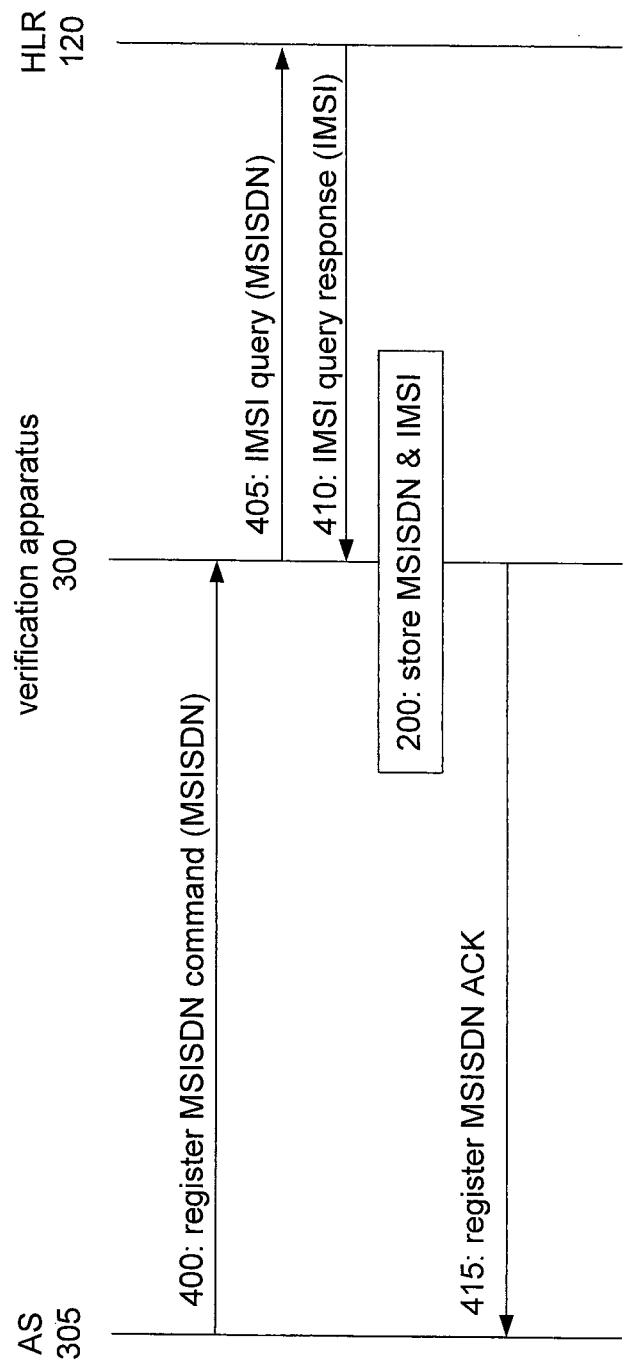
FIG. 4 is a signalling diagram illustrating an embodiment of a method for registering a mobile telephone number with a verification apparatus.

FIG. 4 is a signalling diagram schematically illustrating signalling that may be performed in relation to step 200 of FIG. 2. The signalling of FIG. 4 illustrates a scenario wherein the AS 305 instructs the verification apparatus 300 to register a mobile telephone number in relation to which future verification may be requested by the AS 305. A Register MSISDN Command 400 is transmitted from the AS 305 to the verification apparatus 300, the Register MSISDN Command 400 comprising a mobile telephone number to be registered by the verification apparatus 300. Upon receipt of the Register MSISDN Command 400, the verification apparatus 300 sends an IMSI query 405 towards the HLR in which the mobile subscription associated with the mobile telephone number is registered, the IMSI query 405 including the mobile telephone number. The IMSI query 405 will be received by the HLR 120 of the network 103 in which the mobile telephone number is registered, possibly via a gateway 310 as discussed in relation to FIG. 3. An IMSI query response 410 is then received by the verification apparatus 300 from the HLR 120, the IMSI query response 410 including the mobile subscriber identity number associated with the mobile telephone number. As mentioned above, the IMSI query response may include further information relating to the subscription associated with the mobile telephone number, such as for example information on in which network 103 the mobile telephone number is registered, and in which network the mobile subscription is currently active.

Upon receipt of the IMSI query response 410, the verification apparatus 300 stores the mobile telephone number and its associated mobile subscriber identity number in a database. Alternatively, the mobile telephone number could be stored upon receipt of the Register MSISDN Command 400, and the associated mobile subscriber identity number could be stored upon receipt of the IMSI query response 410.

If desired, a Register MSISDN ACK 415 could then be sent to the AS 305, indicating that the requested registering of the mobile telephone number has been completed.

In FIG. 4, storing of a mobile telephone number and associated mobile subscriber identity number is initiated by the receipt of a register MSISDN command message 400 from the AS 305. In this scenario, the mobile telephone number could for example have been manually or automatically registered for a service in the AS 305 prior to the AS 305 sending the message 400. The storing of the mobile telephone number and associated mobile subscriber identity number in the verification apparatus 300 could alternatively be initiated in other ways, such as for example by manually entering a mobile telephone number in a user interface of the verification apparatus 300.

Figure 5B:
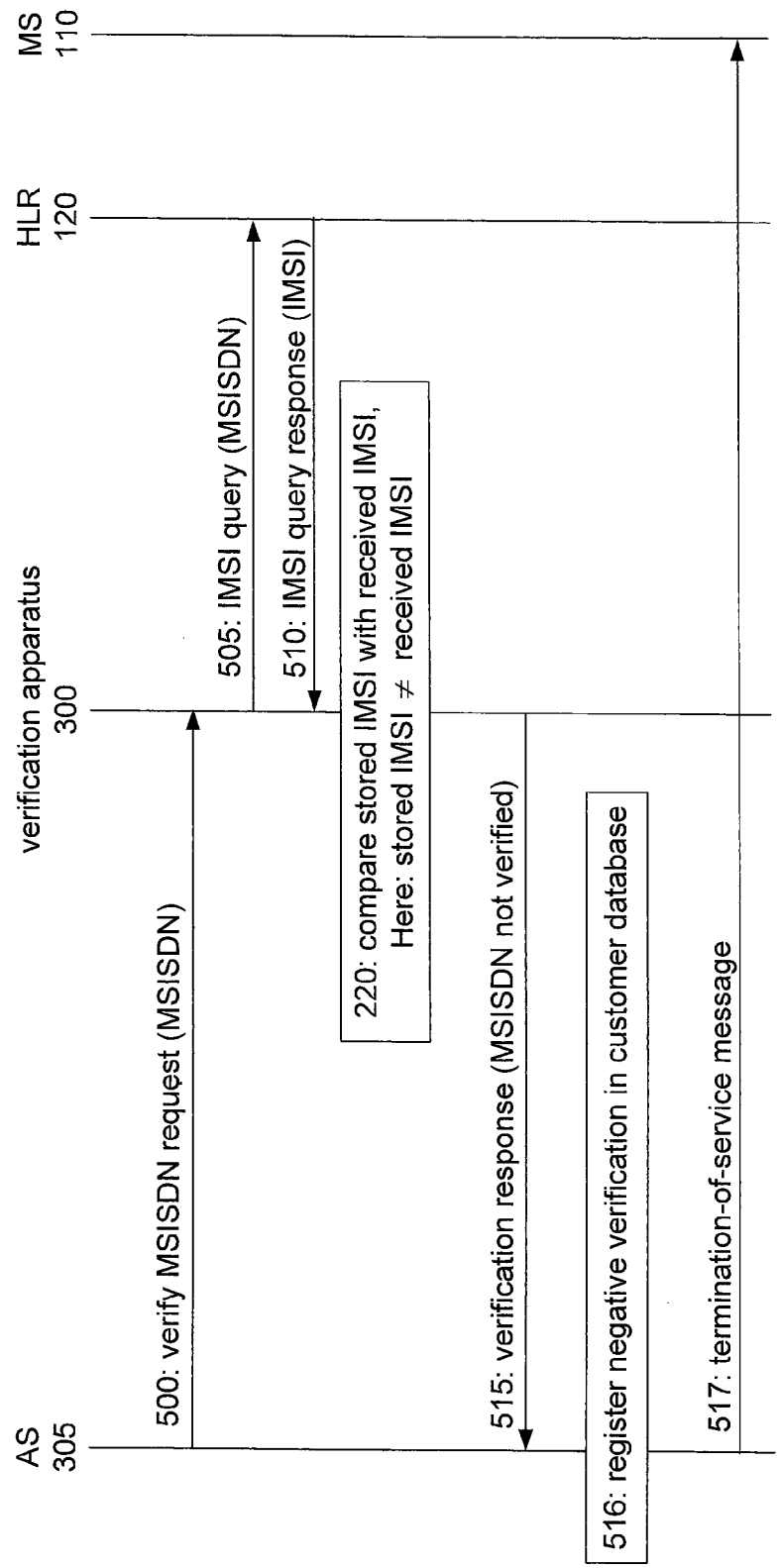
FIG. 5b is a signalling diagram illustrating a signalling scenario in an embodiment of a method for verifying a mobile telephone number.

FIGS. 5a-5d are signalling diagrams illustrating different scenarios and embodiments of the invention, wherein it is assumed that an entry comprising a mobile telephone number and associated mobile subscriber identity number has already been stored in a verification apparatus 300 (cf. step 200 of FIG. 2 and FIG. 4). In FIG. 5a, a verification apparatus 300 receives a Verify MSISDN Request message 500 from the AS 305, the Verify MSISDN Request message 500 including a mobile telephone number to be verified. The receipt of the Verify MSISDN Request message 500 triggers the verification apparatus 300 to send an IMSI query 505 which includes the mobile telephone number, the IMSI query 505 being received by the HLR 120 of the network 103 in which the mobile telephone number is registered. The verification apparatus 300 then receives an IMSI query response 510 from the HLR 120, the IMSI query response 510 including the mobile subscriber identity number associated with the mobile telephone number in the HLR 120.

Upon receipt of the IMSI query response 510, the verification apparatus 300 performs step 220 of FIG. 2, wherein the mobile subscriber identity number received in IMSI query response 510 is compared to the mobile subscriber identity number stored in association with the mobile telephone number in the verification apparatus 300 (cf. step 200 of FIGS. 2 and 4). In the scenario illustrated in FIG. 5a, the received mobile subscriber identity number corresponds to the stored mobile subscriber identity number, and the mobile telephone number is thus verified. Initiation of the messaging-or-positioning service is then performed by the verification apparatus by sending a positive verification response to the AS 305, wherein the positive verification response 515 includes an indication that the verification was successful, e.g. in the form of a value of a flag or other parameter in verification response message 515.

FIG. 5b illustrates a scenario similar to that of FIG. 5a, but wherein the comparison performed in step 220 shows that the stored mobile subscriber identity number does not correspond to the mobile subscriber identity number received in the IMSI query response 505. A verification response 515 is sent by the verification apparatus 300 to the AS 305, the verification response 515 including an indication that the stored mobile subscriber identity number does not correspond to the one currently associated with the mobile telephone number, i.e. that the verification result is negative. As discussed above, further information could be included in a verification response 515.

In the embodiment of the method illustrated in FIG. 5b, the AS 305 registers, in a customer database, that a negative verification response has been received in relation to the mobile telephone number, see event 516. A message 517 is then sent to the mobile telephone number, informing the user of the mobile telephone number that the third party service in relation to which the telephone number verification was performed has been terminated for the mobile telephone number. Such message 517 could alternatively be sent by the AS 305 requesting a mobile radio communications network 100 to deliver the message 517 by use of a proprietary or standardized protocol, cf. the discussion in relation to step 225 above, or the sending o such message 517 could be omitted.

Figure 5C:
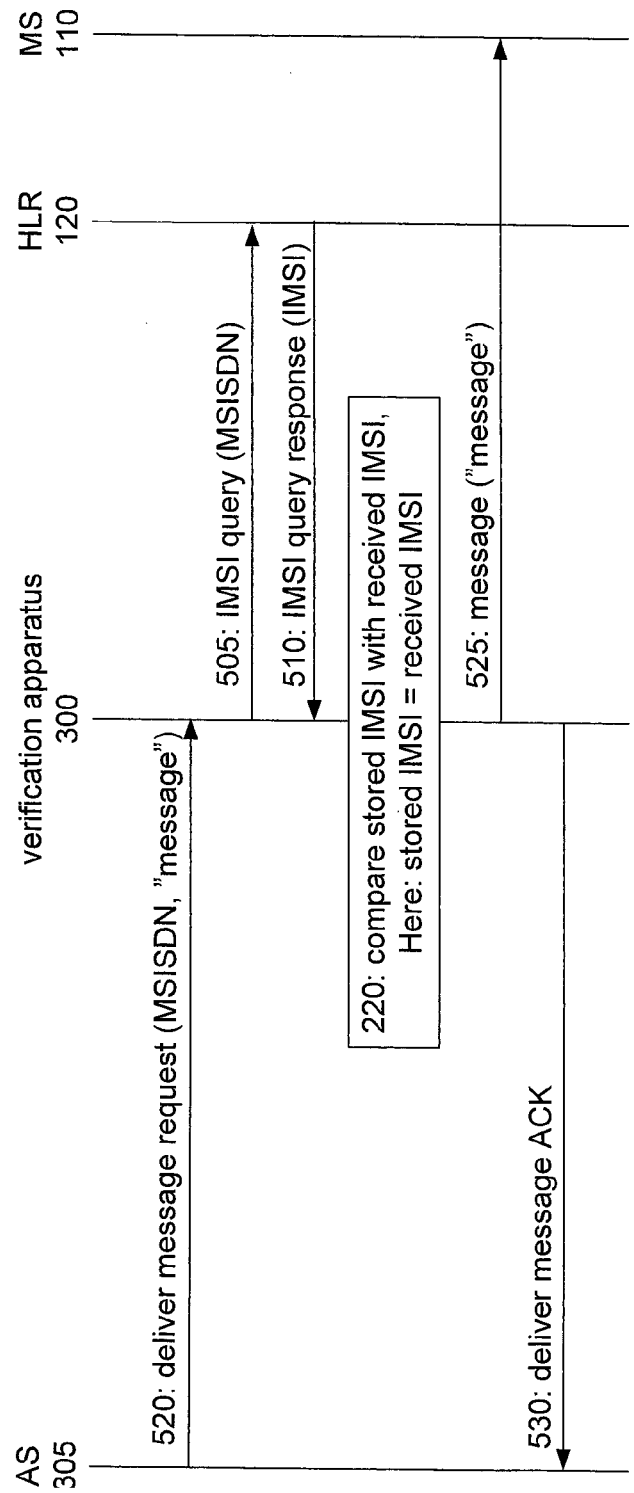
FIG. 5c is a signalling diagram illustrating a signalling scenario in an embodiment of a method for verifying a mobile telephone number.

As mentioned above, a request for verification of a mobile telephone number could be included in the request for a messaging-or-positioning service. FIG. 5c illustrates a scenario wherein a request for verification of a mobile telephone number is included in a request for delivery of a particular message to a subscriber in a mobile radio communications network 103, by means of for example SMS, MSM, e-mail, WAP, or any other message delivery service. A Deliver Message Request message 520 is received by a verification apparatus 300 from a service provide 305. The Deliver Message Request 520 includes information on a mobile telephone number to which the message should be delivered, as well as information to be included in the message. Upon receipt of the Deliver Message Request 520, the verification apparatus 300 transmits an IMSI query 505, receives an IMSI query response 510 and performs a comparison 220 of the stored and received mobile subscriber identity number as described in relation to FIG. 5a. In the scenario of FIG. 5c, the comparison shows that the mobile subscriber identity number received in the IMSI query 510 corresponds to that stored in the verification apparatus 300, and the mobile telephone number can thus be verified. Hence, a message 525, including the information to be to be included received in the Deliver Message Request 520, is transmitted to the mobile station 110 associated with the mobile telephone number. The message 525 could for example be sent by the verification apparatus 300 requesting a mobile radio communications network 103 to deliver the message 517 by use of a proprietary or standardized protocol, cf. the discussion in relation to step 225 above.

A Deliver Message ACK 530 is then transmitted by the verification apparatus 300 to the AS 305 in FIG. 5c. Such Deliver Message ACK 530 could alternatively be transmitted prior to the transmission of message 525 to the mobile subscription as a verification response message 515, or transmitted in response to a delivery ACK received in response to the transmission of message 525, or it could be omitted.

Figure 5D:
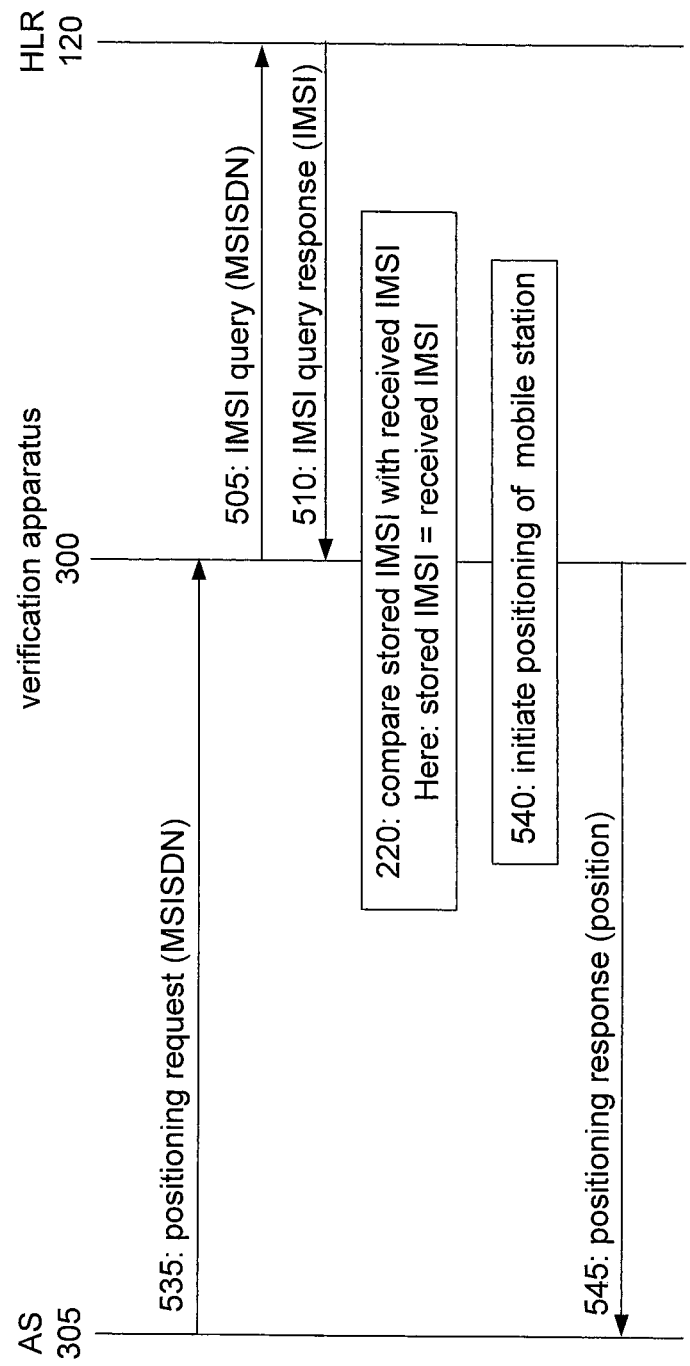
FIG. 5d is a signalling diagram illustrating a signalling scenario in an embodiment of a method for verifying a mobile telephone number.

FIG. 5d illustrates a scenario wherein a request for verification of a mobile telephone number is included in a request for positioning of the mobile subscription associated with the mobile telephone number. A verification apparatus 300 receives a Positioning Request 535, the Positioning Request 535 including information on the telephone number of the mobile subscription to be positioned. Upon receipt of the Positioning Request 520, the verification apparatus 300 transmits an IMSI query 505, receives an IMSI query response 510 and performs a comparison 220 of the stored and received mobile subscriber identity numbers as described in relation to FIG. 5a. In the scenario of FIG. 5d, the comparison shows that the mobile subscriber identity number received in the IMSI query 510 corresponds to that stored in the verification apparatus 300, and the mobile telephone number can thus be verified. Hence, the verification apparatus 300 initiates positioning of the mobile subscription associated with the mobile telephone number. Such positioning could for example be initiated by the verification apparatus 300 requesting a mobile radio network 100 to perform positioning by means of triangulation, or by the verification apparatus requesting the mobile radio network 100 to send a cell-ID of the cell wherein the mobile station associated with the mobile telephone number is currently active, or in any other way suitable for the resolution requirements on the requested positioning. When the position of the mobile subscription is known to the verification apparatus 300, a Positioning Response message 545, including an indication of the position of the mobile subscription associated with the mobile telephone number, is sent to the AS 305. In the example given above wherein the position of a mobile subscription is used in order to avoid fraud at cash machines, a table listing the identity of the cell(s) covering the location of each cash machine operated by the third party service provider, or a table listing the geographical position of all such cash machines, could for example be kept by the verification apparatus 300 or the AS 305. A comparison between the location of the mobile subscription obtained by the positioning, and the location of the cash machine where a cash card is used for withdrawal of money could then be performed, the cash card being registered with the same cash machine customer as the mobile telephone number. If such table listing positions of cash machines is kept by the verification apparatus 300, a positioning request message 535 could in this example advantageously include an indication of the cash machine to which the positioning request 535 relates, and the positioning result 517 could for example include a flag indicating whether or not the mobile station 110 associated with the mobile telephone number is currently located in the vicinity of this cash machine.

If the comparison 220 performed in the scenarios of FIG. 5c or 5d had shown that the received mobile subscriber identity number had not corresponded to that stored by the verification apparatus 300 in step 200, the transmission of message 525 (FIG. 5c) or the positioning (FIG. 5d) would typically not have been performed. As discussed above in relation to FIG. 2, an indication that the subscription associated with the mobile telephone number has changed since the mobile telephone number was registered with the verification apparatus 300 could advantageously be transmitted to the AS 305 in a verification response 515, or in a positioning response 545/deliver message ACK 530.

In one implementation, a particular service request type received by a verification apparatus from an application server, such as a Positioning Request 535 or a Deliver Message Request 520, could invoke a mobile telephone number verification by default. In an alternative implementation, a service request could include a flag, or other indication, indicating to the verification apparatus 300 whether or not a verification of the mobile telephone number is requested in relation to the delivery of the requested messaging-or-positioning service.

The IMSI query 405 and the IMSI query response 410 of FIGS. 5a-5d could advantageously be of the same message type as the IMSI query 405 and the IMSI query response 410 of FIG. 4, although different message types could alternatively be used.

Messages transmitted between a verification apparatus 300 and a third party service provider 305, such as a register MSISDN request 400, a verify MSISDN request 500, a verification response 515, a positioning request 535, etc, could for example be proprietary messages. If the verification apparatus 300 and the third party AS 305 are implemented in the same node, such messages could be internal messages.

The signalling scenarios illustrated in FIGS. 5a-5d are examples only, and the verification method illustrated by FIG. 2 could be implemented in a number of different third party service scenarios and in relation to a number of messaging-or-positioning services.

Figure 6A:
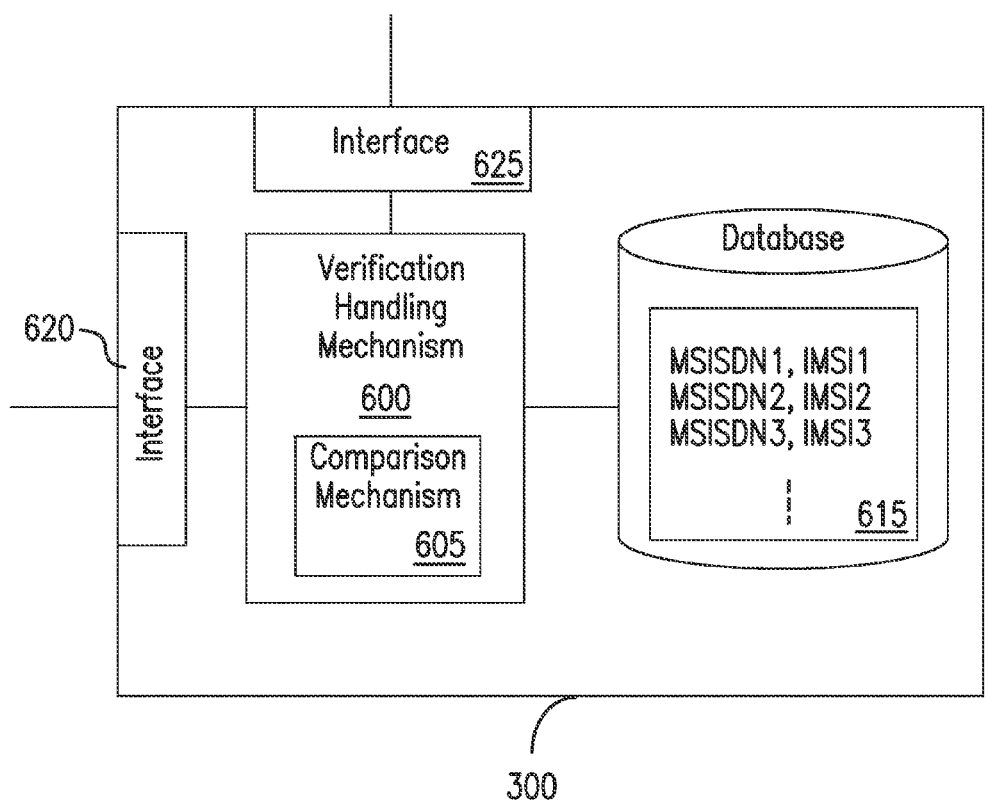
FIG. 6a is a schematic illustration of an embodiment of a verification apparatus.

In FIG. 6a, an example of the verification apparatus 300 is schematically illustrated. Verification apparatus 300 of FIG. 6a comprises a verification handling mechanism 600 including a comparison mechanism 605. Verification apparatus 300 further comprises a database 615 in which entries comprising mobile telephone numbers and associated mobile subscriber identity numbers may be stored. The verification handling mechanism 600 is connected to the database 615 so that the verification handling mechanism 600 can access data stored in database 615. The verification handling mechanism 600 is furthermore connected to an interface 620 for communication with at least one AS 305 and to an interface 625 for communication with HLRs 120 (possibly via a gateway 310 as illustrated in FIG. 3). The interfaces 620 and 625 may be the same, or different, physical interfaces, and they can typically serve as both signal inputs and signal outputs.

Verification handling mechanism 600 of FIG. 6a is arranged to receive a Register MSISDN Command 400 from an applications server 305 via interface 620 and to instruct interface 625 to send an IMSI query 405 in response to receipt of a Register MSISDN Command 405. Verification handling mechanism 600 of FIG. 6a is furthermore arranged to receive an IMSI query response 410 via interface 625, and to instruct database 610 to store, in the database 615, a mobile telephone number received in a Register MSISDN Command 400 and an associated mobile subscriber identity number received in an IMSI query response 410. Furthermore, verification handling mechanism 600 is arranged to receive a Verify MSISDN Request 500 in relation to a mobile telephone number from the AS 305 via interface 620, and to instruct interface 625 to send an IMSI query 505 in response to receipt of a Verify MSISDN Request 500. Verification handling mechanism 600 is furthermore arranged to receive an IMSI query response 510 via interface 625; to extract a received mobile subscriber identity number from a received IMSI query response 510; to retrieve a stored mobile subscriber identity number from database 615; and to deliver a received mobile subscriber identity number and a stored mobile subscriber identity number associated with the same mobile telephone number to the comparison mechanism 605. The comparison mechanism 605 is arranged to compare the received mobile subscriber identity number to the stored mobile subscriber identity number, and to deliver a comparison result. The verification handling mechanism 600 could furthermore be arranged to send a Verification Response 515 to the AS 305.

The verification apparatus 300 of FIG. 6a is given as an example only, and the verification apparatus 300 could be implemented in other ways. For example, instead of, or in addition to, being arranged to receive a request for registering of a mobile telephone number from the AS 305 via interface 620, the verification apparatus 300 could comprise a user interface so that a request for registering of a telephone number could be entered manually. A verification apparatus 300 could furthermore be distributed in a different manner, for example so that a verification handling mechanism 600 is arranged to perform some of the tasks described above, while other entiti(es) are arranged to perform others of the tasks described above. Moreover, the verification apparatus 300 could be implemented in a physically distributed manner, so that for example the database 615 and the verification handling mechanism 600, or parts of the verification handling mechanism 600, are located at different geographical locations while operating as the same logical apparatus.

The verification handling mechanism 600 and the database 615 of FIG. 6a can be implemented by means of suitable software and hardware. For example, the database 615 could be a general purpose database, or a database developed especially for the verification apparatus 300. The database 615 could be compatible with Structured Query Language (SQL), or any other suitable language, for insertion and retrieval of information from the database 615. The verification handling mechanism 600 could for example be implemented by means of one or more general purpose processors, or one or more processors especially developed for the verification apparatus 300, in combination with software for performing verification of a mobile telephone number (cf. FIG. 2).

Figure 6B:
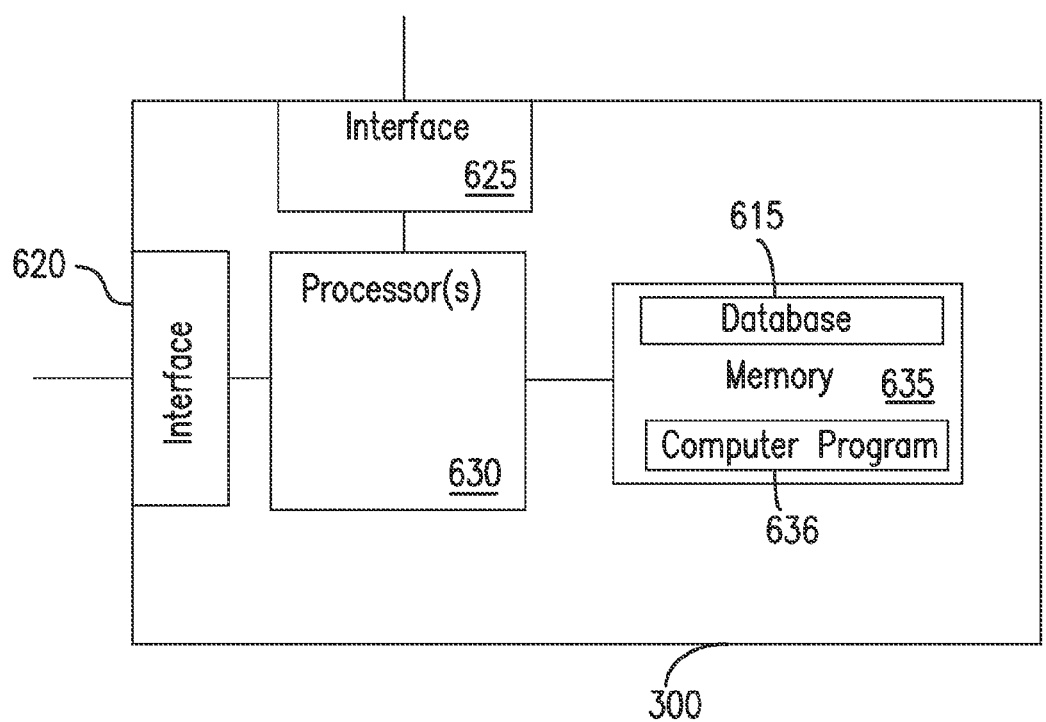

In FIG. 6b, an alternative way of schematically illustrating the verification apparatus 300 of FIG. 6a is shown. FIG. 6b shows the verification apparatus 300 comprising processing means 630 connected to a computer program product 635 in the form of a memory, as well as to interfaces 620 and 625. The memory comprises computer readable code means that stores a computer program 636, which when executed by the processing means 630 causes the verification apparatus 300 to perform the verification method as illustrated in FIG. 2. In other words, the verification handling mechanism 600 and its comparison mechanism 605 may in this embodiment be implemented with the help of corresponding program modules of the computer program 636. In the shown embodiment, the computer program product 635 also comprises the database 615, but in other embodiments the database 615 may be stored in a second memory (not shown) of the verification apparatus 300. The processing means 630 could be one or more processors—for example, one processor of processing means could be arranged to execute code relating to the database 615, and another processor could be arranged to execute code relating to the verification handling mechanism 600, or the same processor could be used for executing the verification handling mechanism code and the database code. The computer program product 635 could be any type of non-volatile computer readable means, such as a hard drive, a flash memory, an EEPROM (electrically erasable programmable read-only memory) a DVD disc, a CD disc, a USB memory, etc.

Figure 7:
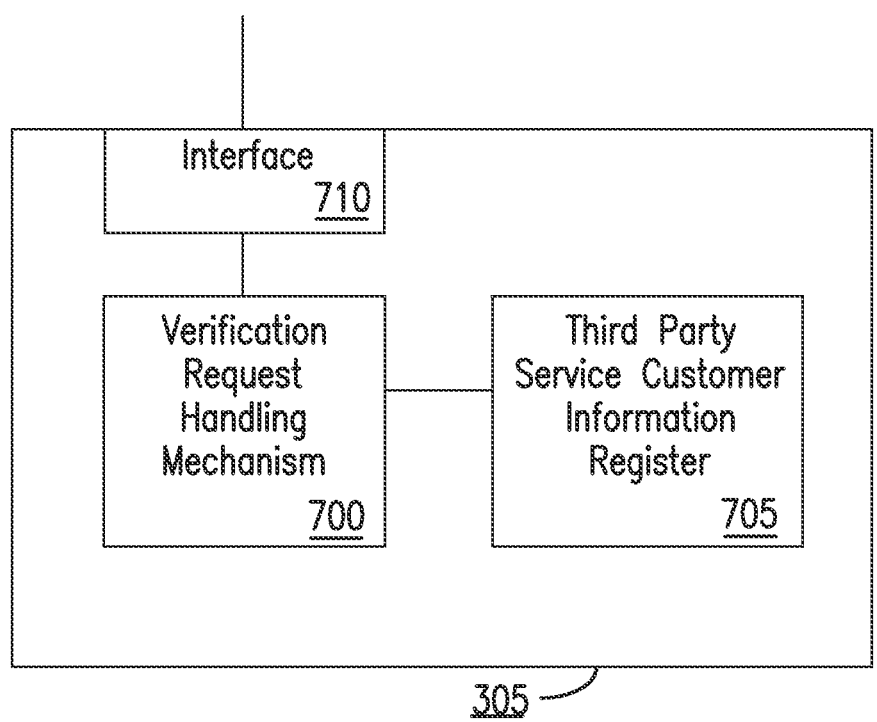
FIG. 7 is a schematic illustration of a third party application server arranged to request verification of a mobile telephone number.

FIG. 7 shows an example of the AS 305 arranged to provide at least one third party service to customers of a third party service provider. The AS 305 comprising a verification request handling mechanism 700, a memory with a third party service customer information register 705 and an interface 710 for communicating to/from the verification apparatus 300, wherein the verification request handling mechanism 700 is connected to the interface 710 and the customer information register 705. The customer information register 705 is comprised in a memory, for example in a database, arranged to store information relating to customers of third party services, such information being for example the telephone number of a customer's mobile subscription, an operator code of the network 103 wherein the customer's mobile subscription is registered, verification result information obtained from the verification apparatus 300 in relation to a customer, information on which services a customer is subscribing to, etc. The verification request handling mechanism 700 is arranged to retrieve information from the customer information register 705, such as a mobile telephone number to be verified; to send a request for registering of a mobile telephone number to a verification apparatus 300 via interface 710 (cf. the register MSISDN command 400 of FIG. 4); and to send a verification request to the verification apparatus 300 in order to determine whether a messaging-or-positioning service in a mobile radio communications system should be performed in relation to a mobile telephone number (cf. the verify MSISDN request 500 of FIG. 5a; the deliver message request 520 of FIG. 5c; and the positioning request 535 of FIG. 5d). The verification request handling mechanism 700 could furthermore be arranged to store information received from a verification apparatus via interface 715 in the customer information register 705, such as information relating to whether or not a verification event has been successful. The AS 305 could be implemented as a suitable combination of hardware and software. The schematic illustration a verification apparatus 300 shown in FIG. 6b could be used also as a schematic illustration of an embodiment of the AS 305, which comprises processing means and memory means, wherein the memory means stores computer program code portions which, when executed on the processing means, causes the AS 305 to send, to a verification apparatus 300, a request for registering a mobile telephone number, as well as computer program code portions which, when executed on the processing means, causes the AS 305 to send, to the verification apparatus 300, a request for verification of the mobile telephone number.

The verification apparatus 300 could for example be implemented as part of an application server. In FIGS. 3-5, the verification apparatus 300 is illustrated as a separate node to the AS 305. However, the verification apparatus 300 may alternatively be implemented as part of the AS 305. If the verification apparatus 300 is part of the AS 305, then any message transmitted between the verification apparatus 300 and the AS 305 could advantageously be an internal message (e.g. the Register MSISDN Command 400, the Verify MSISDN Request 500; the Verification Response 505, etc). Interfaces 620 and 710 would then be internal interfaces.

When a verification apparatus 300 is implemented in a node separate to the AS 305, the verification apparatus 300 could for example serve a plurality of different third party application servers, belonging to the same or different service providers. The verification apparatus 300 could for example be implemented in an application server operating as a broker node of services in a communications system for different service providers. Such a broker node could for example be arranged to perform messaging-or-positioning services in different mobile radio networks 103 upon request from different AS:s 305. An example of a communications system 800 comprising a broker node 805 arranged to provide access to messaging-or-positioning services, provided in a plurality of different mobile radio communications systems 103j−1, 103j, 103j+1, to a plurality of different third party service providers, 305i−1, 305i and 305i+1, is schematically illustrated in FIG. 8. The communications system 800 could include all or part of the mobile radio communications system 100 shown in FIG. 1.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. A method for verification of a mobile telephone number in order to determine whether a messaging-or-positioning service in a mobile radio communications system should be performed in relation to the mobile telephone number, the method comprising:
   receiving, by a verification apparatus, a request from an application server to register a mobile telephone number;
   registering, by the verification apparatus in response to the request from the application server, the mobile telephone number, wherein the registering comprises:
      obtaining, from a home location register, a first mobile subscriber identity number corresponding to the mobile telephone number, and
      then storing the mobile telephone number and the corresponding first mobile subscriber identity number in a database of the verification apparatus;
   receiving, by the verification apparatus from the application server, a request for verification of the mobile telephone number; and
   verifying, by the verification apparatus in response to receiving the verification request, the mobile telephone number, wherein the verifying comprises:
      obtaining, from a home location register, a second mobile subscriber identity number registered in association with the mobile telephone number; and
      indicating, by the verification apparatus to the application server, whether the first mobile subscriber identity number matches the second mobile subscriber identity number.

2. The method of claim 1, wherein
   the application server is arranged to provide a third party service which utilizes the messaging-or-positioning service;
   the request for verification is generated by the application server arranged to provide the third party service; and
   the application server is arranged to provide the third party service, in response to the indicating, by sending a request for performance of the messaging-or-positioning service.

3. The method of claim 1, wherein
   the application server operates as a broker node of services in a communications system;
   the application server is arranged to provide a third party service which utilizes the messaging-or-positioning service; and
   the broker node performs the service, or sends a request for performance of the messaging-or-positioning service to a mobile radio communications network in the communications system, or sends a verification response indicative of the result of the verifying to the application server.

4. The method of claim 1, wherein the indicating comprises:
   sending, from the verification apparatus, a verification response indicative of whether the first mobile subscriber identity number matches the second mobile subscriber identity number.

5. The method of claim 4, wherein:
   the verification response comprises an indication of whether or not the first mobile subscriber identity number and the second mobile subscriber identity number have been issued by the same mobile network operator.

6. The method of claim 1, wherein the messaging-or-positioning service forms part of a third party service, and
   the method further comprises sending a message to the mobile telephone number via the mobile radio communications system, the message indicating that delivery of the third party service has been terminated, in response to determining that the first mobile subscriber identity number does not match the second mobile subscriber identity number.

7. The method of claim 1, wherein the obtaining of the registering step or the obtaining of the verifying step comprises sending an International Mobile Subscriber Identity (IMSI) query to a home location register.

8. A method for verifying whether a messaging-or-positioning service in a mobile radio communications system should be performed, the method comprising:
   registering, by an application server, a mobile telephone number with a verification apparatus, wherein the registering comprises sending a registration request to the verification apparatus, the registration request comprising an indication of the mobile telephone number to be registered;
   verifying, by an application server subsequent to the registering, the mobile telephone number, wherein the verifying comprises:
      sending, to the verification apparatus, a request for verification of the mobile telephone number, and
      receiving an indication from the verification apparatus of whether a mobile subscriber identity number corresponding to the mobile telephone number in a home location register at a time of the verifying matches a mobile subscriber identity number corresponding to the mobile telephone number in the home location register at a time of the registering; and
   determining, by the application server that performed the verifying, whether a messaging-or-positioning service in a mobile radio communications system should be performed in relation to the mobile telephone number, wherein the determining is dependent on the verifying.

9. The method of claim 8, wherein the messaging-or-positioning service forms part of a third party service provided by the application server that requested verification.

10. A verification apparatus for verification of a mobile telephone number in order to determine whether a messaging-or-positioning service in a mobile radio communications system should be performed in relation to the mobile telephone number, the verification apparatus comprising:
   a database for storing of a mobile telephone number and an associated mobile subscriber identity number;
   a processor;
   a memory coupled to the processor, wherein the memory stores one or more computer programs executable by the processor to implement:
      receiving a request from an application server to register a mobile telephone number;
      registering, in response to the request from the application server, the mobile telephone number, wherein the registering comprises:

obtaining, from a home location register, a mobile subscriber identity number corresponding to the mobile telephone number, and then storing the mobile telephone number and the corresponding mobile subscriber identity number in the database;

receiving, from the application server, a request for verification of the mobile telephone number;

verifying, in response to receiving the verification request, the mobile telephone number, wherein the verifying comprises:

obtaining, from a home location register, a mobile subscriber identity number registered in association with the mobile telephone number to be verified; and indicating, to the application server, whether the mobile subscriber identity number received in the verifying matches the mobile subscriber identity number stored in the registering.

11. The verification apparatus of claim 10, wherein:
the indicating comprises sending a verification response that includes an indication of whether or not the stored mobile subscriber identity number and the received mobile subscriber identity number have been issued by the same mobile network operator.

12. The verification apparatus of claim 10, wherein:
the obtaining, as part of the registering or as part of the verifying, comprises sending an International Mobile Subscriber Identity (IMSI) query to a home location register.

13. The verification apparatus of claim 10, wherein
the messaging-or-positioning service forms part of a third party service and the one or more computer programs are further executable send a message to a mobile telephone number, wherein the message indicates that delivery of the third party service has been terminated in relation to the mobile telephone number.

14. The application server operating as a broker node of services in the communications system, the broker node comprising the verification apparatus of claim 10.

15. An application server arranged to provide a third party service which utilizes a messaging-or-positioning service, comprising:

an output arranged to register a mobile telephone number with a verification apparatus, wherein the registering comprises sending a registration request to the verification apparatus, the registration request for registering comprising an indication of the mobile telephone number to be registered; and wherein the output is further arranged to verify the mobile telephone number subsequent to the registering, wherein the verifying comprises:

sending, to the verification apparatus, a request for verification of the mobile telephone number, receiving an indication from the verification apparatus of whether a mobile subscriber identity number corresponding to the mobile telephone number in a home location register at a time of the verifying matches a mobile subscriber identity number corresponding to the mobile telephone number in a home location register at a time of the registering; and determining, by the application server that performed the verifying, whether a messaging-or-positioning service in a mobile radio communications system should be performed in relation to the mobile telephone number, wherein the determining is dependent on the verifying.

16. The application server of claim 15, further comprising an input arranged to receive a verification response indicative of the result of the verification of a mobile telephone number;
a third party service customer information register; and
one or more computer programs executable by a processor of the application server to store, in the third party service customer information register, as part of a third party service subscription, a record of the indication.

17. A non-transitory computer program product comprising computer readable storage storing a computer program for verification of a mobile telephone number in order to determine whether a messaging-or-positioning service in a mobile radio communications system should be performed in relation to the mobile telephone number, the computer program comprising computer program code portions which, when run on a verification apparatus, causes the verification apparatus to:

receive a request from an application server to register a mobile telephone number;

register, in response to the request from the application server, the mobile telephone number, wherein the registering comprises:

obtaining, from a home location register, a mobile subscriber identity number corresponding to the mobile telephone number, and then storing the mobile telephone number and a corresponding mobile subscriber identity number in the database of the verification apparatus;

verify, in response to receiving a verification request, the mobile telephone number, wherein the verifying comprises:

obtaining, from a home location register, a mobile subscriber identity number registered in association with the mobile telephone number in the home location register;

determining whether the mobile subscriber identity number received in the verifying matches the mobile subscriber identity number stored in the registering; and initiate the performance of the messaging-or-positioning in response to determining that the mobile subscriber identity number received in the verifying matches the mobile subscriber identity number stored in the registering.

18. The non-transitory computer program product of claim 17, wherein obtaining the mobile subscriber identity number from the home location register, as part of the register operation, comprises sending an International Mobile Subscriber Identity (IMSI) query requesting a mobile subscriber identity number registered in association with the mobile telephone number in the home location register, the IMSI query comprising the mobile telephone number.

* * * * *

UNITED STATES PATENT AND TRADEMARK OFFICE
CERTIFICATE OF CORRECTION

PATENT NO.       : 8,655,313 B2
APPLICATION NO.  : 13/255399
DATED            : February 18, 2014
INVENTOR(S)      : Agevik et al.

It is certified that error appears in the above-identified patent and that said Letters Patent is hereby corrected as shown below:

On the Title Page, Item (75), under "Inventors", in Column 1, Lines 1-2, delete "Bjorn Idren, Hasselby (SE)" and insert -- Björn Idrén, Hässelby (SE) --, therefor.

On the Title Page, Item (56), under "OTHER PUBLICATIONS", in Column 2, Line 2, delete "Architechture" and insert -- Architecture --, therefor.

In the Specification

In Column 12, Line 35, delete "service provide" and insert -- service provider --, therefor.

In Column 13, Line 3, delete "Positioning Request 520," and insert -- Positioning Request 535 --, therefor.

In Column 14, Line 38, delete "MSISDN Command 405." and insert -- MSISDN Command 400. --, therefor.

Signed and Sealed this
Eleventh Day of November, 2014

Michelle K. Lee
*Deputy Director of the United States Patent and Trademark Office*